US008106945B2

(12) United States Patent
Tseng

(10) Patent No.: US 8,106,945 B2
(45) Date of Patent: Jan. 31, 2012

(54) INTELLIGENT FISHING TACKLE

(76) Inventor: Chien Tu Tseng, Junghe (TW)

( * ) Notice: Subject to any disclaimer, the term of this patent is extended or adjusted under 35 U.S.C. 154(b) by 1329 days.

(21) Appl. No.: 11/734,220

(22) Filed: Apr. 11, 2007

(65) Prior Publication Data

US 2008/0134564 A1 Jun. 12, 2008

(30) Foreign Application Priority Data

Dec. 5, 2006 (TW) ................................ 95145122 A

(51) Int. Cl.
*H04N 7/18* (2006.01)
*A01K 75/02* (2006.01)
*A01K 85/00* (2006.01)
*A01K 83/00* (2006.01)
*A01K 83/02* (2006.01)

(52) U.S. Cl. ..................... 348/81; 43/17.6; 43/35; 43/37

(58) Field of Classification Search .................... 348/81; 43/17.6, 35, 37
See application file for complete search history.

(56) References Cited

U.S. PATENT DOCUMENTS

| 5,611,166 A * | 3/1997 | Day ................................. 43/35 |
| 6,862,836 B1 * | 3/2005 | Ridings ............................. 43/35 |
| 2001/0040623 A1 * | 11/2001 | Weber .............................. 348/81 |
| 2005/0282665 A1 * | 12/2005 | Tarng et al. ..................... 473/465 |
| 2007/0101634 A1 * | 5/2007 | Clapp ............................... 43/35 |
| 2008/0289240 A1 * | 11/2008 | Cheung .......................... 43/17.6 |

FOREIGN PATENT DOCUMENTS

| FR | 2664468 A1 | 1/1992 |
| JP | 1979-49889 A | 4/1979 |
| JP | 4006671 U | 1/1992 |
| JP | 9285240 A | 11/1997 |
| JP | 2001-258445 A | 9/2001 |
| JP | 2004-187626 A | 7/2004 |
| JP | 2005-013191 A | 1/2005 |
| TW | 462188 | 11/2001 |
| TW | M300037 | 11/2006 |
| WO | 9502322 A1 | 1/1995 |
| WO | 2007043041 A2 | 4/2007 |

* cited by examiner

*Primary Examiner* — Liangche A Wang

(57) ABSTRACT

An intelligent fishing tackle comprises a fishing line, a sinker module, a microprocessor system module and a hook module, in which the sinker module is connected on the fishing line and includes a camera module used for capturing a underwater image, the microprocessor system module judges a fishing object according to the underwater image and determines whether a control signal is generated, and the hook module is connected on the fishing line and switched to a fishing processing state according to the control signal. Whether to capture the fishing object can be judged directly under the water or the water image is transmitted to the shore for a rodster to decide whether to capture the fishing object.

18 Claims, 7 Drawing Sheets

INTELLIGENT FISHING TACKLE

CROSS-REFERENCES TO RELATED APPLICATIONS

This non-provisional application claims priority under 35 U.S.C. §119(a) on Patent Application No(s). 95145122 filed in Taiwan, R.O.C. on Aug. 17, 2006, the entire contents of which are hereby incorporated by reference.

FIELD OF THE INVENTION

The present invention relates to a fishing tackle, and more particularly to an intelligent fishing tackle.

BACKGROUND

Afloat is an indispensable tool for fishing, a rodster mainly takes a situation that a fish pulls bait to move and a fishing line is dragged at the same time to cause the float to move vertically. Hence, the vertical moving of the float is deemed as an identification mark that the fish is searching the bait.

However, not only that the fish searches the bait might drag the float to be moved vertically, but also many other factors might cause the float to move vertically, for example, an approach of a small inset such as dragonfly, mosquito or fly, wind on water surface or even underwater undercurrent or ripple, might drag the float to move vertically, they could confuse the rodster to differentiate the float movement accuracy. Even if the fish searches the bait to drag the float to move vertically, it does not necessarily mean that the fish has been hooked, the fish might peck the bait and that is all. Besides, the rodster might return a hooked fish back to the water because it is too small or the fish kind does not meet the rodster's requirement, he must replace new bait on the hook again to continue fishing; this is very inconvenient to the rodster. For protecting fish ecological environment, some countries or areas might limit fingerling fishing; the fingerling must be returned back to the water even if it is catched; it has the same inconvenience mentioned above.

Therefore, for improving a fishing tackle structure to allow the rodster to see a picture that a fish searches bait to enable the rodster to judge whether the fish is hooked so as to solve the problem of the low accuracy of the float movement and further to judge whether the fish kind or size meet the rodster's requirement so as to enable the rodster to decide whether to catch the bait searching fish, the present invention is proposed.

SUMMARY OF THE INVENTION

The present invention proposes an intelligent fishing tackle; it comprises a fishing line, a sinker module, a microprocessor system module and a hook module, in which the sinker module is installed on the fishing line and comprises a camera module used for capturing an underwater image, the microprocessor system module judges a fishing object according the underwater images and determine whether a control signal is generated and the hook module is installed on the fishing line, switches to a fishing processing state according to the control signal and lets a hook, which is attached with bait out.

The microprocessor system module according to the present invention judges the fishing object through the underwater images and can determine whether to capture the fishing object directly under the water or transmit the underwater image to a water shore for a rodster to see and decide whether to capture the fishing object.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
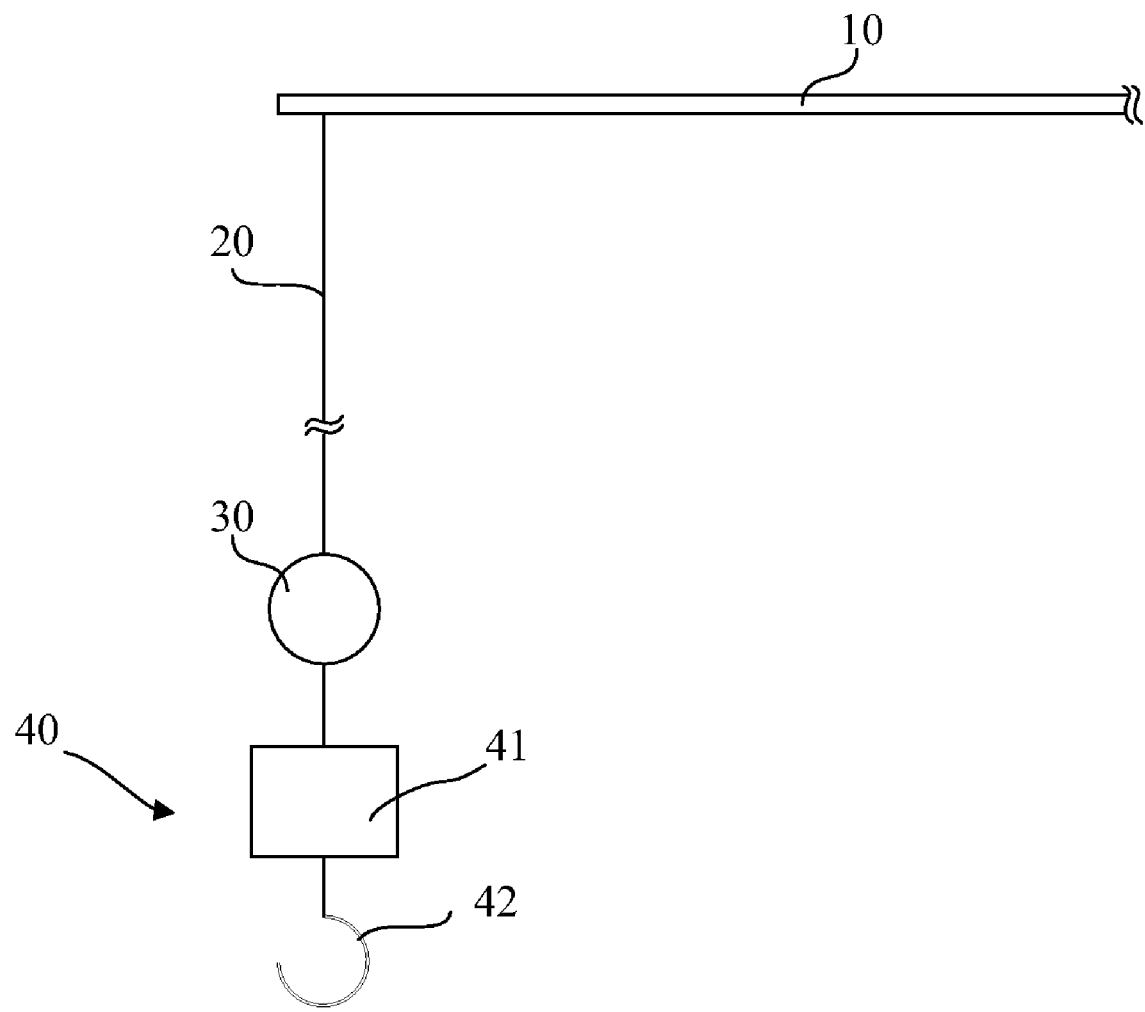
FIG. 1 is a schematic view, showing an intelligent fishing tackle of a first preferred embodiment according to the present invention.
Figure 2:
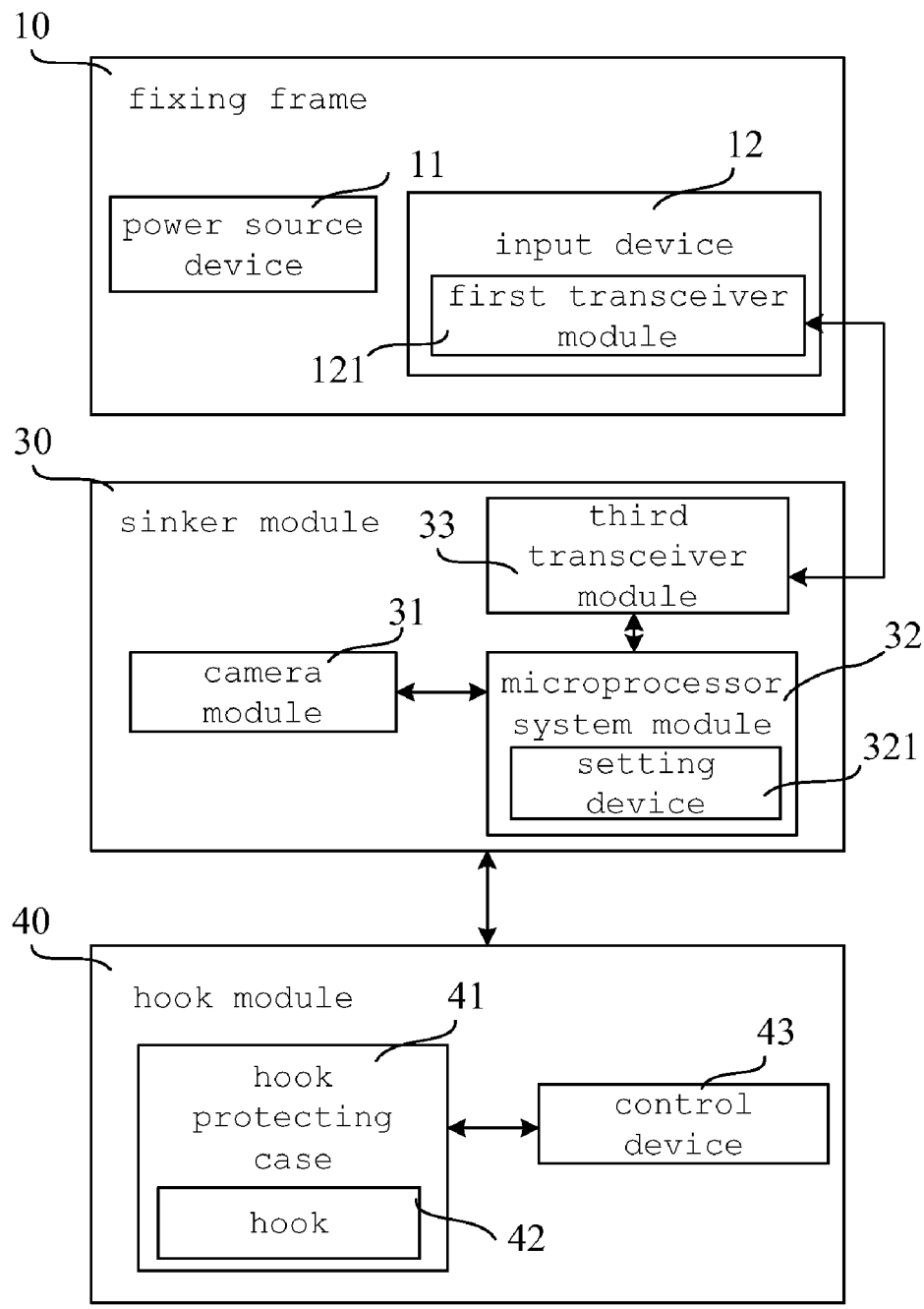
FIG. 2 is a block diagram, showing an intelligent fishing tackle of a first preferred embodiment according to the present invention.

Please refer to FIGS. 1 and 2. FIGS. 1 and 2 show an intelligent fishing tackle of a first preferred embodiment according to the present invention. The fishing tackle comprises a fishing line 20, a sinker module 30 and a hook module 40.

The fishing line 20 is made from a nylon material or a carbon fiber material and tied up on a fixing frame 10. The fixing frame 10 is fixed on a shore or a boat. The fixing frame 10 can be a fixing pole.

The sinker module 30 comprising a camera module 31 and a microprocessor system module 32 is installed on the fishing line, in which the camera module 31 is used for capturing an underwater image and the microprocessor system module 32 is used for judging a fishing object according to the underwater image and deciding whether to generate a control signal. Furthermore, the microprocessor system module 32 can judge a fishing object's kind or size separately according to the underwater image, and can also judge a fishing object's kind and size at the same time. Besides, a setting device 321 is disposed in the microprocessor system module 32. The setting device 321 allows a rodster to disable or enable the microprocessor system module 32 to judge the fishing object. And then the hook module 40 can be in a traditional fishing state or controlled by the microprocessor system module 32 according to a preset value set by the setting device 321.

The camera module 31 mentioned above can be a CCD camera lens or a CMOS camera lens, and the microprocessor system module 32 can be a System On Chip (SOC).

The hook module 40 is connected on the fishing line 20 and can be switched to be a fishing processing state or a fishing stopping state according the control signal. The hook module 40 comprises a hook protecting case 41, a hook 42 and a control device 43, in which the hook 42 is equipped in the hook protecting case 41 and let the hook 42 out the hook protecting case 41 according to the control signal through the control device 43 so as to switch to the fishing processing state. Moreover, the control device 43 can also pull the hook 42 back into the hook protecting case 41 according to the control signal so as to switch to the fishing stopping state.

According to the structure disclosed by the present invention, a power source device 11 can further be equipped on the fixing frame 10 used for transmitting power needed for the sinker module 30 and the hook module 40 to them through the fishing line 20 or a separately installed power source line.

When a rodster is fishing, the camera module 31 will continuous capturing the underwater image and transmit it to the microprocessor system module 32, and when the fishing object is near, the microprocessor system module 32 judges the fishing object's kind or size according to the underwater image to decide whether to generate a control signal to enable the hook module 40 to be switched to the fishing processing state or the fishing stopping state so as to judge whether to catch the fishing object directly under the water. If the fishing object's kind or size does not meet the user's requirement, the microprocessor system module 32 does not issue the control signal to the hook module 40, but if the hook 42 is already out of the hook protecting case 41, the microprocessor system module 32 will generate the control signal to the hook module 40 to pull the hook 42 back into the hook protecting case 41 to prevent the fishing object, not meeting the rodster's requirement, from being hooked; this can solve the conventional problem that the fishing object not meeting the rodster's requirement is released back to the water after the fishing object is hooked so as to elevate the fishing convenience. If the fishing object's kind or size meets the rodster's requirement, the microprocessor system module 32 will generate the control signal and transmit it to the hook module 40 and let the hook 42 out of the hook protecting case 41 to wait for the fishing object to be hooked.

Furthermore, the rodster also allows the camera module 31 to stop capturing the underwater image through the setting device 321 and the microprocessor system module 32 to stop judging the fishing object so as to enable the hook module 40 to maintain a traditional fishing state to wait for the fishing object to be hooked.

In the structure mentioned above, the fishing tackle can further includes an input device 12; it is positioned on the fixing frame 10 to allow the rodster to input commands to process operation and input desired fishing objects' kinds and sizes. Moreover, the rodster can set or adjust preset values of the setting device 321 by operating the input device 12 to cause the camera module 31 to stop capturing the water images and the microprocessor system module 32 to stop judging the fishing depending on the commands. Besides, the rodster inputs commands and the microprocessor system module 32 generates a control signal depending the commands to cause the hook module 40 to be switched to the fishing processing state or the fishing stopping state.

The input device 12 comprises a first transceiver module 121 and the sinker module 30 comprises a third transceiver 33. When the user key-in commands through the input device 12, the first transceiver module 121 transmits the commands to the third transceiver module 33 to control the camera module 31 and the microprocessor system module 32.

The input device 12 can be a keyboard or touch screen. Furthermore, the first transceiver module 121 can be connected to the third transceiver module 33 through the fishing line 20, a transmission line or a wireless transmission mode to process transmission. A wireless communication protocol adopted for the wireless transmission mode can be chosen from one of Bluetooth, WiMax, 802.12, 802.12a, 802.12b, 802.12g, 802.12i, 802.1x and communication protocols used in other wireless internet technologies.

Figure 3:
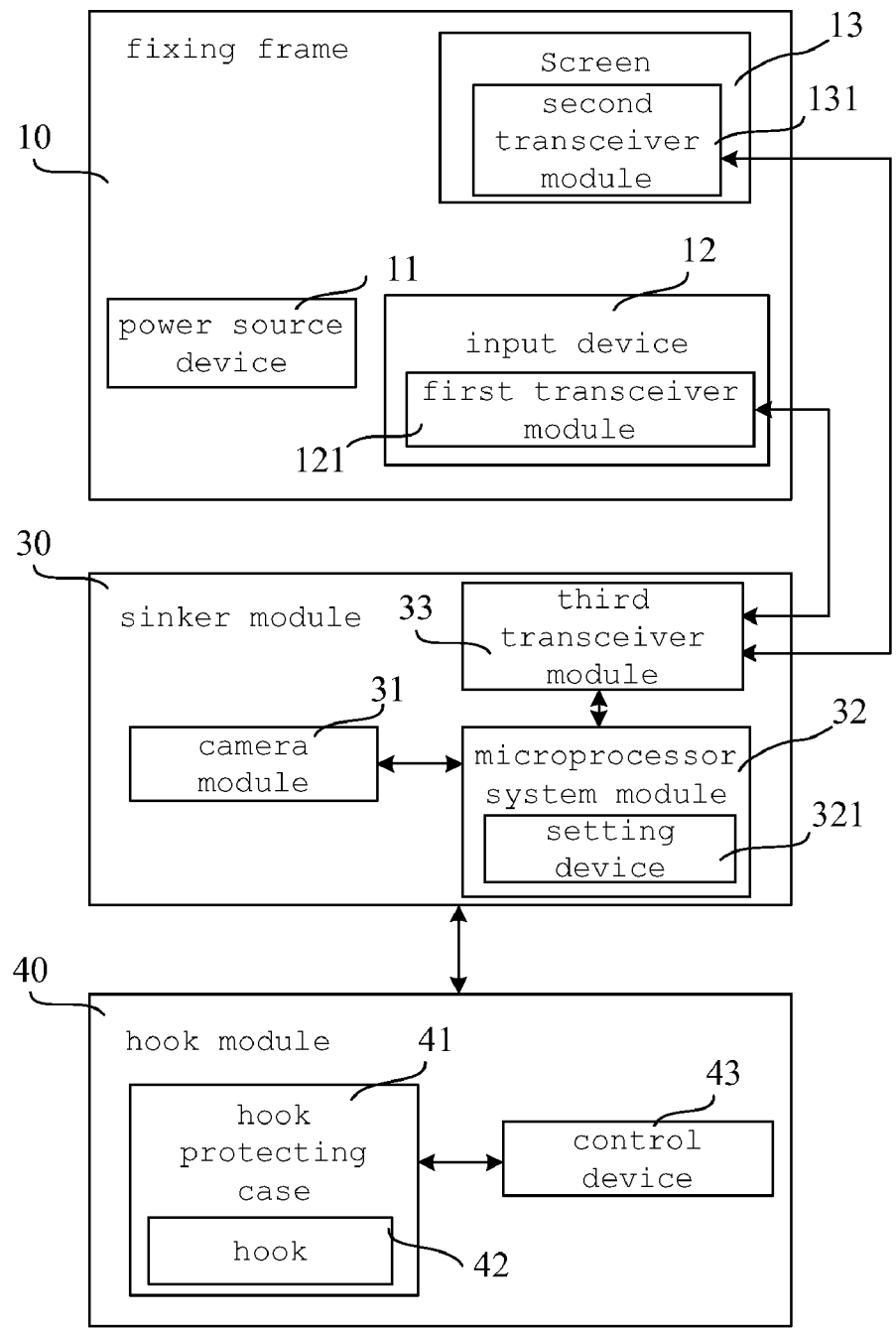
FIG. 3 is a block diagram, showing an intelligent fishing tackle of a second preferred embodiment according to the present invention.

Please refer to FIG. 3. FIG. 3 shows a fishing tackle of a second preferred embodiment according to the present invention.

The fishing tackle further comprises a screen 13 installed on the fixing frame 10. The screen 13 comprises a second transceiver module 131 that can receive the underwater image transmitted from the third transceiver module 33 and transmit the underwater image to the screen 13 to be displayed thereon. Here, the second transceiver module 131 can be connected with the third transceiver module 33 to process transmission through the fishing line 20, a transmission line or a wireless transmission mode. A wireless communication protocol adopted for the wireless transmission mode can be chosen from one of Bluetooth, WiMax, 802.12, 802.12a, 802.12b, 802.12g, 802.12i, 802.1x and communication protocols used in other wireless internet technologies.

The underwater image being displayed on the screen 13 allows the user sees not only a situation that a fishing object searches bait but also a situation that every kind of living beings moves underwater so as to increase the fun of the rodster while fishing. Furthermore, the rodster can judge the fishing object's kind or size through the screen 13 and operate the input device 12 to enable the hook module 40 to be switched to the fishing processing state or the fishing stopping state.

The first transceiver module 121 and the second transceiver module 131 mentioned above can be separated, depending on a practical design requirement, or be as the same transceiver module to be shared by the input device 12 and the screen 13 for processing the transmission.

Figure 4:
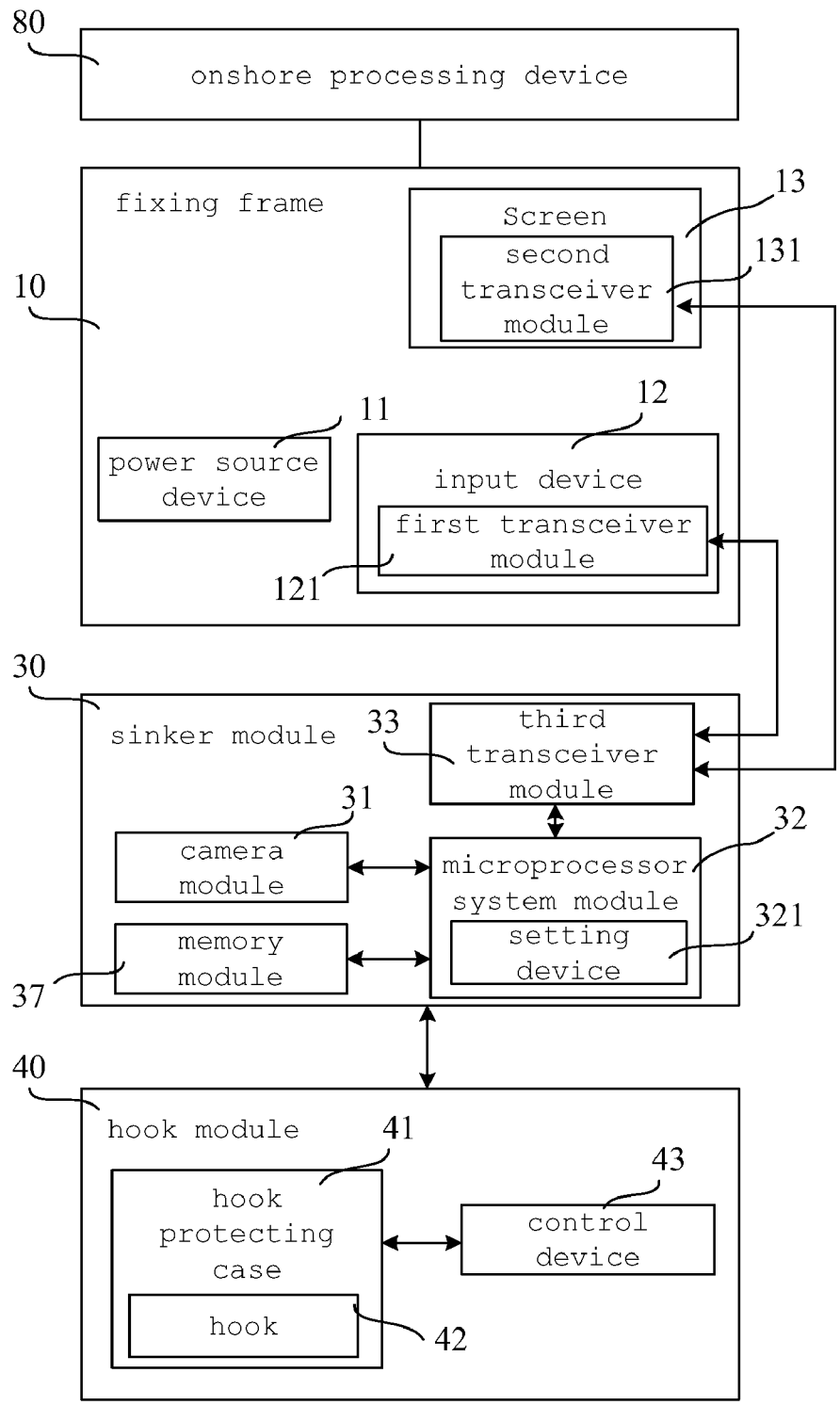
FIG. 4 is a schematic view, showing an intelligent fishing tackle of a third preferred embodiment according to the present invention.

Please refer to FIG. 4. FIG. 4 shows a fishing tackle of a third preferred embodiment according to the present invention.

The fishing tackle further comprises a memory module 37 installed in the sinker module 30 or the screen 13 and used for storing the underwater images captured by the camera module 31 and in the meantime the underwater images are displayed through the screen 13 anytime; this allows the user sees not only a situation that a fishing object searches bait but also a situation that every kind of underwater creature moves so as to increase the fun of the rodster while fishing. Besides, the fixing frame 10 can also be connected to an onshore processing device 80 such as personal computer, notebook computer, PDA or cellular phone on shore. The processing device 80 can be used for setting or adjusting a preset value of the setting device 321 to allow the camera module 31 to stop capturing underwater images and the microprocessor system module 32 to stop judging the fishing object depending on commands. Besides, the rodster key-in the commands through the onshore processing device 80 and the microprocessor system module 32 generates the control signal depending on the command to allow the sinker module 40 to be switched to be the fishing processing state or the fishing stopping state. Moreover, the onshore processing device 80 can not only be taken as the input device 12 but also display the underwater images so as to replace the input device 12 or the screen 13 to decrease the production cost of the intelligent fishing tackle and increase the use convenience thereof.

Figure 5:
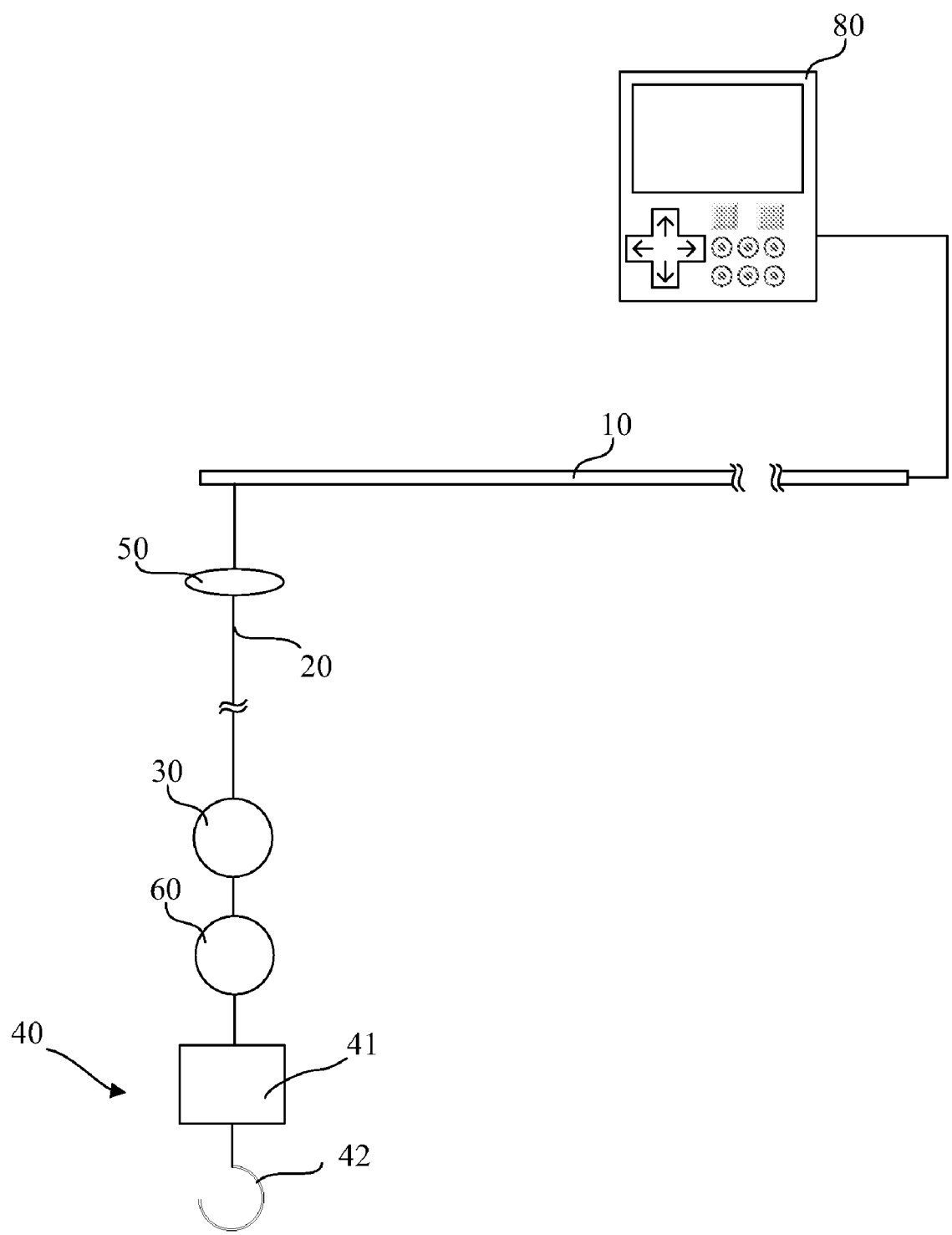
FIG. 5 is a block diagram, showing an intelligent fishing tackle of a fourth preferred embodiment according to the present invention.

Please refer to FIG. 5. FIG. 5 shows a fishing tackle of a fourth preferred embodiment according to the present invention.

In the embodiment, a float 50 and weight balance module 60 can further be installed on the fishing line 20. The weight balance module 60 can be used for increasing weight and increasing the stability of the sinker module 30 to allow the camera module 31 not to be wavered randomly while capturing the underwater images.

Figure 6:
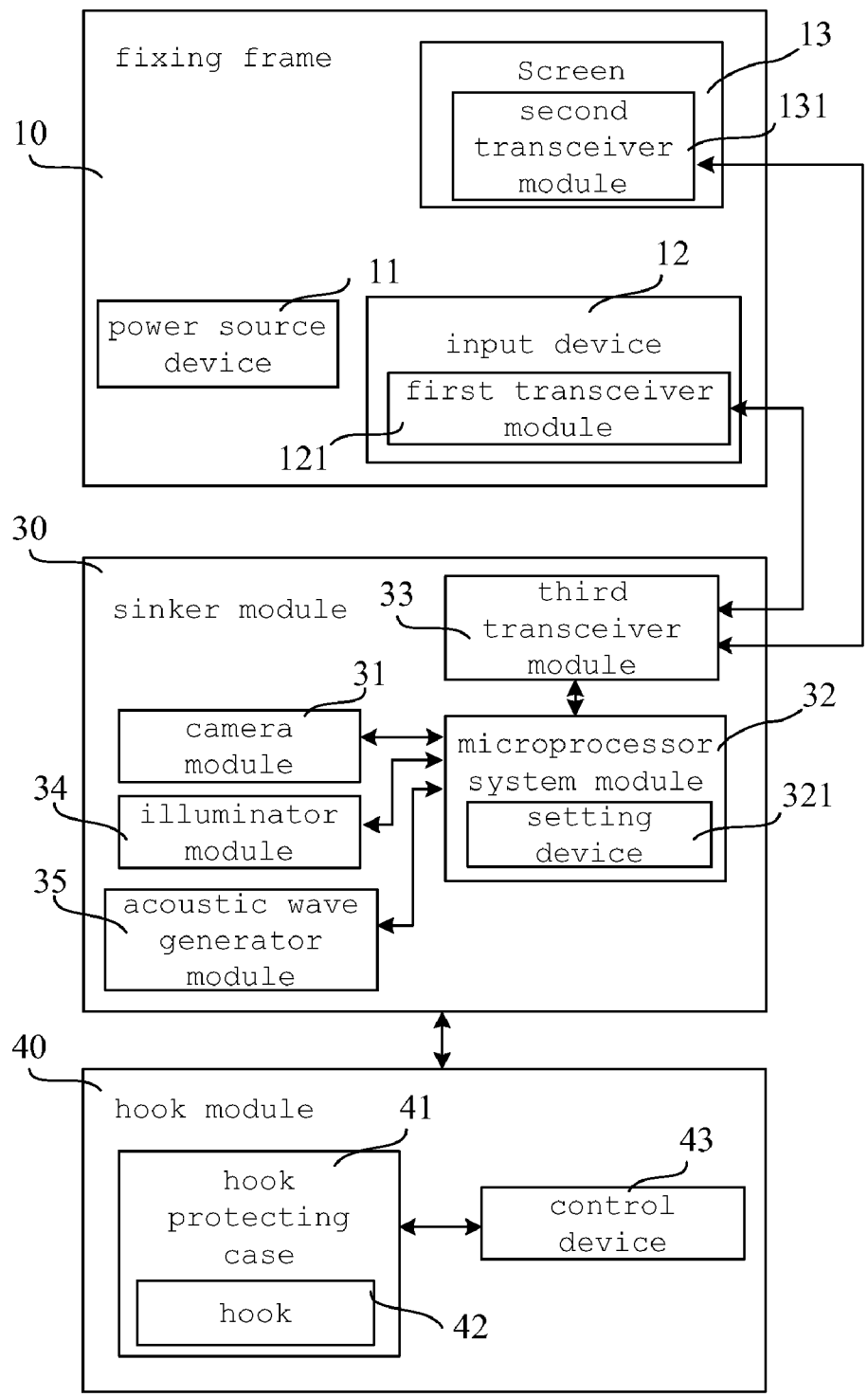
FIG. 6 is a block diagram, showing an intelligent fishing tackle of a fifth preferred embodiment according to the present invention.

Please refer to FIG. 6. FIG. 6 shows a fishing tackle of a fifth preferred embodiment according to the present invention.

The sinker module 30 further includes an illuminator module 34 used for not only providing a light source needed when the camera module 31 is capturing the underwater images but also generating at least one flash to attract the fishing object to be close or intimidate the fishing object to leave. Furthermore, an acoustic wave (sound) generator module 35 can also be installed in the sinker module 30. The acoustic wave generator module 35 is used for generating at least one sound wave to attract the fishing object to be near or intimidate the fishing object to go for away. Whereby, the chance that the fishing object required for the rodster is hooked can be increased, and the number of captured fishes can be increased.

Figure 7:
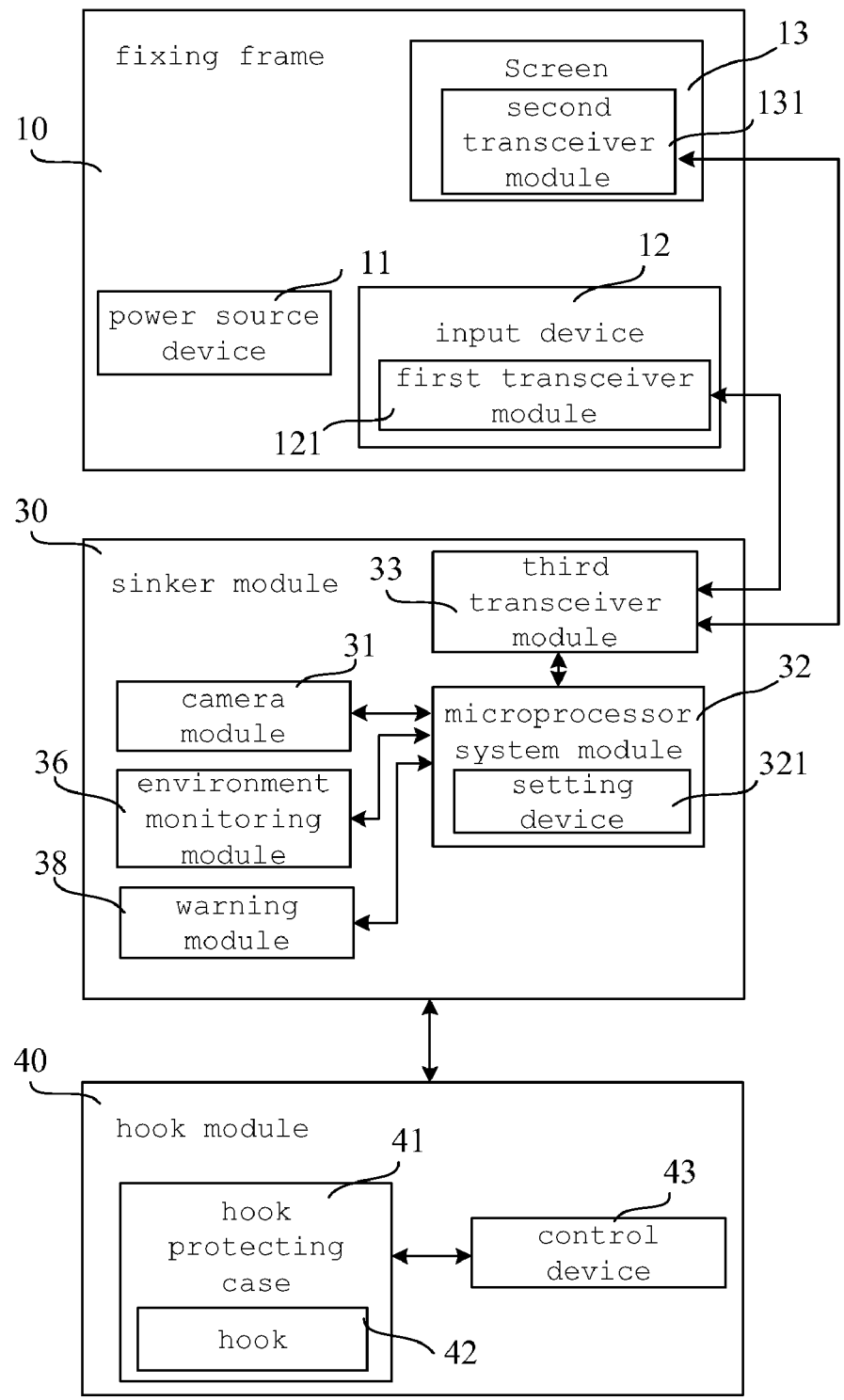
FIG. 7 is a block diagram, showing an intelligent fishing tackle of a sixth preferred embodiment according to the present invention.

Please refer to FIG. 7. FIG. 7 shows a fishing tackle of a sixth preferred embodiment according to the present invention.

For increasing the fishing convenience of the rodster and allowing the user to handle the fishing environment factors, the sinker module 30 further includes an environment monitoring module 36 used for measuring temperature, water depth, water turbidity, water flow speed and etc, and transmitting them to the screen 13 to be displayed through it via the third transceiver module 33 and the second transceiver 131 to enable the rodster to handle the fishing environment.

Besides, the fishing tackle further includes a warning module 38. The microprocessor system module 32 sends a warning signal to the warning module 38 to allow the warning module 38 to inform ashore so as to generate a signal such as sound or flash to attract the rodster attention so as to increase the use convenience of the fishing tackle when the fishing object strikes the bait on the hook 42 or is hooked.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An intelligent fishing tackle, comprising:
a fishing line;
a sinker module, installed on said fishing line and comprising:
a camera module, used for capturing a underwater image; and
a microprocessor system module, judging a fishing object depending on said underwater image and deciding whether to generate a control signal; and
a hook module, installed on said fishing line and switching between a fishing processing state and a fishing stopping state depending on said control signal, wherein said hook module comprises:
a hook protecting case;
a hook, equipped in said hook protecting case; and
a control device configured to release and retract said hook out of said hook protecting case according to said control signal, thereby switching between said fishing processing state and said fishing stopping state.

2. The intelligent fishing tackle according to claim 1, wherein said sinker module further comprises an illuminator module.

3. The intelligent fishing tackle according to claim 1, wherein said sinker module further comprises a sound wave generating module.

4. The intelligent fishing tackle according to claim 1, wherein said microprocessor system module comprises a setting device, said microprocessor system module chooses whether to stop functions thereof depending on a preset value of said setting device to allow said hook module to be maintained in a traditional fishing state.

5. The intelligent fishing tackle according to claim 1, further comprising a weight balance module installed on said fishing line.

6. The intelligent fishing tackle according to claim 1, further comprising a fixing frame used for connecting with said fishing line.

7. The intelligent fishing tackle according to claim 6, further comprising a power source device positioned on said fixing frame and transmitting power to said sinker module and said hooker module through a power source line.

8. The intelligent fishing tackle according to claim 6, further comprising a power source device positioned on said fixing frame and transmitting power to said sinker module and said hooker module through said fishing line.

9. The intelligent fishing tackle according to claim 6, further comprising an input device positioned on said fixing frame and used for allowing a rodster to input a command; said input device comprising a first transceiver module and said sinker module comprising a third transceiver module; said first transceiver module transmitting said command to said third transceiver module; said microprocessor system module starting judging a fishing object according to said command, and generating said control signal according to said command to allow said hook module to be switched to a fishing processing state.

10. The intelligent fishing tackle according to claim 9, wherein said microprocessor system module stops judging said fishing object according said command, and generates said control signal according to said command to allow said hook module to be switched to be a fishing stopping state.

11. The intelligent fishing tackle according to claim 6, further comprising a screen positioned on said fixing frame; said screen comprising a second transceiver module and said sinker module comprising a third transceiver module; said third transceiver module transmit said underwater image to said second transceiver module to display said underwater image through said screen.

12. The intelligent fishing tackle according to claim 11, wherein said sinker module further comprises an underwater environment monitor module and a display of monitoring results is processed through said screen.

13. The intelligent fishing tackle according to claim 6, further comprising an onshore processing device connected with said fixing frame.

14. The intelligent fishing tackle according to claim 1, further comprising a memory module used for storing said underwater image.

15. The intelligent fishing tackle according to claim 1, wherein the microprocessor system module is configured to generate said control signal according to judging said fishing object by said underwater image to be a fish of a pre-established size or kind.

16. The intelligent fishing tackle according to claim 1, further comprising a warning module, said microprocessor system module issuing a warning signal to said warning module to inform a rodster when said hook module catches a fishing object.

17. An intelligent fishing tackle, comprising:
- a fishing line;
- a sinker module, installed on said fishing line and comprising:
- a camera module, used for capturing a underwater image; and
- a microprocessor system module, judging a fishing object depending on said underwater image and deciding whether to generate a control signal;
- a hook module, installed on said fishing line and switching to a fishing processing state depending on said control signal;
- a fixing frame used for connecting with said fishing line; and
- an input device positioned on said fixing frame and used for allowing a rodster to input a command; said input device comprising a first transceiver module and said sinker module comprising a third transceiver module; said first transceiver module transmitting said command to said third transceiver module; said microprocessor system module starting judging a fishing object according to said command, and generating said control signal according to said command to allow said hook module to be switched to a fishing processing state.

18. The intelligent fishing tackle according to claim 17, wherein said microprocessor system module stops judging said fishing object according said command, and generates said control signal according to said command to allow said hook module to be switched to be a fishing stopping state.

* * * * *